United States Patent [19]

Solomon

[11] Patent Number: 5,009,777
[45] Date of Patent: Apr. 23, 1991

[54] REVERSE OSMOSIS AND HOT WATER SYSTEM

[76] Inventor: Donald F. Solomon, 45640 Denizen Heights Rd., Hemet, Calif. 92344

[21] Appl. No.: 481,515

[22] Filed: Feb. 20, 1990

Related U.S. Application Data

[63] Continuation-in-part of Ser. No. 350,521, May 11, 1989, which is a continuation-in-part of Ser. No. 111,697, Oct. 21, 1987, Pat. No. 4,836,924.

[51] Int. Cl.$^5$ .............................................. B01D 61/10
[52] U.S. Cl. ..................... 210/134; 210/136; 210/186; 210/257.2; 210/416.1
[58] Field of Search ............ 210/134, 136, 137, 416.1, 210/257.2, 186, 321.87

[56] References Cited

U.S. PATENT DOCUMENTS

| | | | |
|---|---|---|---|
| 2,500,624 | 3/1950 | Bailey | 103/48 |
| 3,825,122 | 7/1974 | Taylor | 210/134 |
| 4,124,488 | 11/1978 | Wilson | 210/134 |
| 4,187,173 | 2/1980 | Keefer | 210/136 X |
| 4,288,326 | 9/1981 | Keefer | 210/652 X |
| 4,348,161 | 9/1982 | Shibata | 417/403 |
| 4,367,140 | 1/1983 | Wilson | 210/134 |
| 4,410,429 | 10/1983 | Harvey et al. | 210/416.1 |
| 4,498,982 | 2/1985 | Skinner | 210/96.2 |
| 4,632,754 | 12/1986 | Wood | 210/409 X |
| 4,645,599 | 2/1987 | Fredkin | 210/416.1 |
| 4,836,924 | 6/1989 | Solomon | 210/321.87 |

FOREIGN PATENT DOCUMENTS

| | | |
|---|---|---|
| 1176572 | 10/1984 | Canada . |
| 0028913 | 11/1980 | European Pat. Off. . |
| 3101694 | 8/1982 | Fed. Rep. of Germany . |
| 2088968 | 10/1980 | United Kingdom . |

*Primary Examiner*—Frank Spear
*Attorney, Agent, or Firm*—Gordon L. Peterson

[57] ABSTRACT

A water system comprising a hot water system, including a hot water heater and a conduit coupled to feedwater under pressure for conducting water to and from the hot water heater. An injector pump is coupled to the feedwater under pressure and has a water port coupled to an inlet port of a reverse osmosis module and a brine port coupled to a brine outlet port of the reverse osmosis module and to the conduit. The injector pump provides water to the water port of the injector pump and increases the pressure of the brine at the brine port of the injector pump to greater than the pressure of the feedwater so that the brine can be injected into the hot water system.

17 Claims, 3 Drawing Sheets

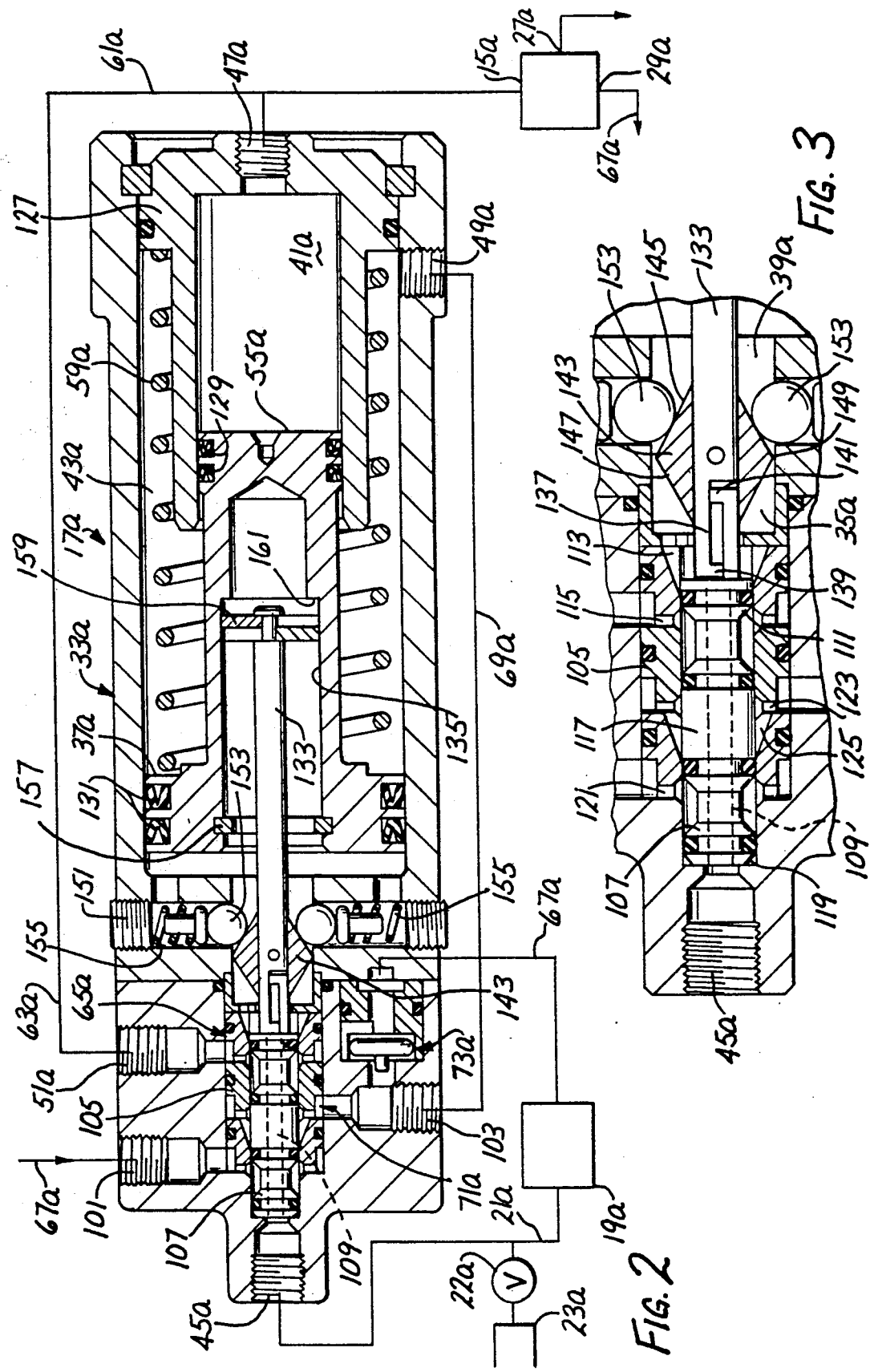

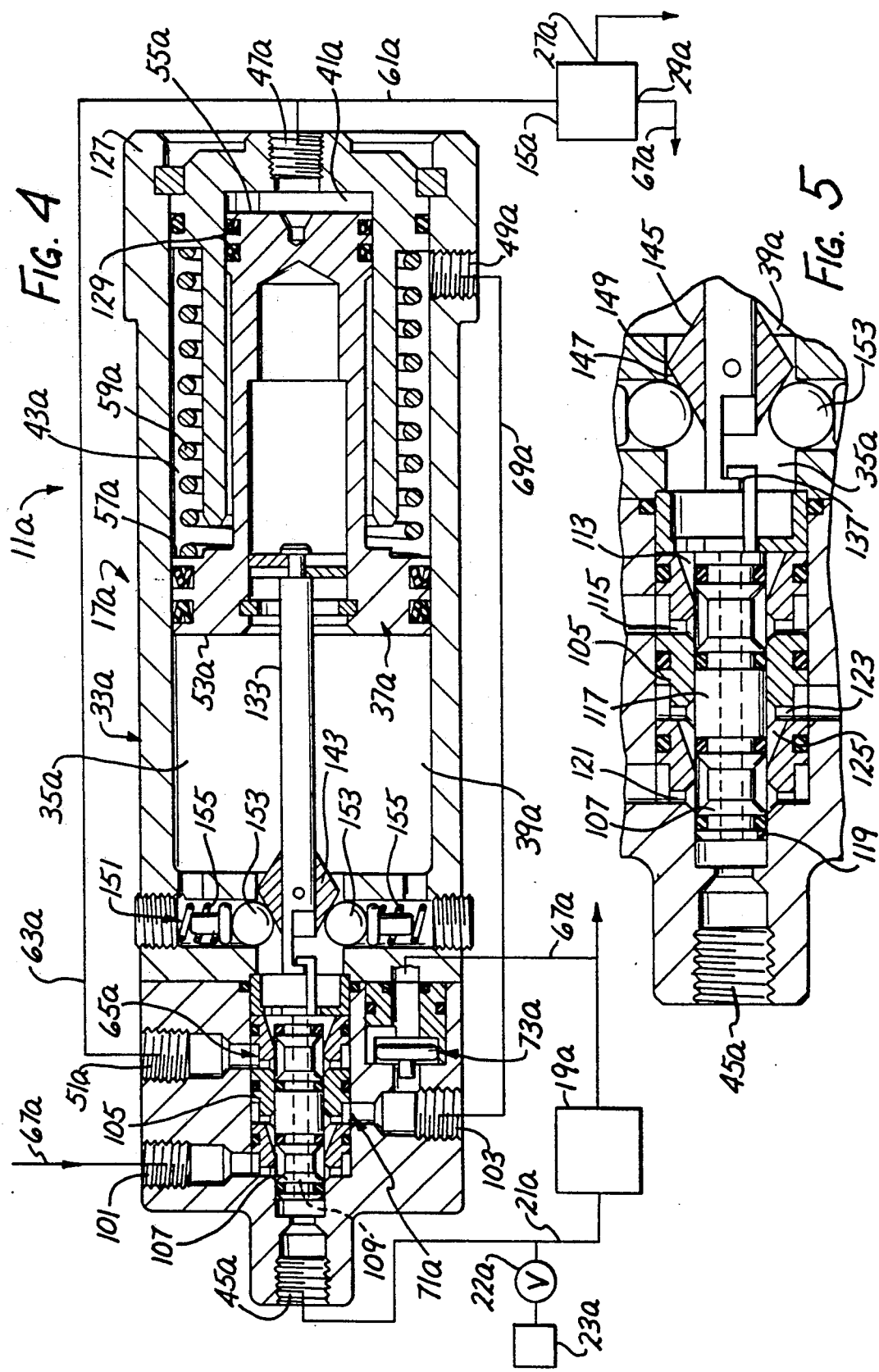

REVERSE OSMOSIS AND HOT WATER SYSTEM

BACKGROUND OF THE INVENTION

This application is a continuation-in-part of application Ser. No. 350,521 filed May 11, 1989, entitled Reverse Osmosis System And Automatic Cycling Booster Pump Therefor which in turn is a CIP of application Ser. No. 111,697 filed October 21, 1987, entitled Reverse Osmosis System And Automatic Cycling Booster Pump Therefor, now Pat. No. 4,836,924 issued June 6, 1989.

Reverse osmosis systems are commonly used for removing impurities from water, such as drinking water. A conventional reverse osmosis system includes a reverse osmosis module or filter having a reverse osmosis membrane. Feedwater is supplied to the module, and the module delivers filtered product water having a reduced impurity content. Not all of the feedwater supplied to the module passes through the reverse osmosis membrane, and this unfiltered water, or brine, is commonly discharged to drain and wasted. Even if some of the brine is recycled through the reverse osmosis system, there is ultimately some quantity of the brine which is discharged to drain.

Potable water shortages are not uncommon. Water shortages are particularly acute in the arid regions of high population, such as in Southern California. Because of the water which is inherently wasted in a reverse osmosis system, reverse osmosis water purification is less adaptable to regions which are subject to water shortages.

One way to reduce the flow of water to drain is to interpose an orifice or capillary tube in the brine drain line. These orifices are subject to clogging and never permit a high velocity flow of feed water past the reverse osmosis membrane surfaces to clean the membrane.

For a common household reverse osmosis system, it has been suggested that the brine can be discharged into the hot water line of the home. Because domestic hot water is not normally used for drinking, the presence of the usual amounts of brine in the hot water line is acceptable. However, so far as applicant is aware, no one has thus far provided a suitable system for discharging the brine into the hot water line. This task is more difficult than it may at first appear because the hot water line is at feedwater pressure, and so to accomplish the injection, it is necessary to raise the pressure of the brine above the pressure of the feedwater into which it will be injected.

SUMMARY OF THE INVENTION

This invention solves the problems identified above by providing a water system in which the brine is injected into the hot water system. This is accomplished using an injector pump which supplies water to the inlet port of the reverse osmosis module and increases the pressure of the brine to greater than the pressure of the feedwater so the brine can be injected into the hot water system.

To eliminate the need for electric motors and the accompanying wiring, the injector pump is preferably driven by the feedwater under pressure and is still more preferably driven solely by the feedwater under pressure. When driven by the feedwater under pressure, the injector pump supplies water to the inlet port of the reverse osmosis module at less than the pressure of the feedwater.

The water system of this invention comprises a hot water system which includes a hot water heater and conduit means coupled to the feedwater under pressure for conducting water to and from the hot water heater. The water system also includes a reverse osmosis module having an inlet port, a product water port for filtered product water and a brine outlet port for the brine.

According to this invention, the injector pump is coupled to the feedwater under pressure and has a water port coupled to the inlet port of the reverse osmosis module and a brine port coupled to the brine outlet port of the reverse osmosis module and the conduit means. The injector pump includes means for providing water to the water port of the injector pump for supplying the inlet port of the reverse osmosis module and means for increasing the pressure of the brine at the brine port of the injector pump to greater than the pressure of the feedwater so that the brine can be injected into the hot water system.

A brine valve can advantageously be used for controlling the flow of brine from the brine port of the injector pump to the hot water system. Similarly, a water valve can advantageously be used for controlling the flow of water from an inlet chamber of the injector pump to the water port of the injector pump. Either, and preferably both, of the valves can be controlled by the injector pump.

The injector pump preferably includes a piston having pumping and reset strokes, with the piston providing water to the water port of the injector pump and brine to the brine port of the injector pump during the pumping stroke. With this system, the pressure of the water at the water port is less than the pressure of the feedwater during the pumping stroke.

The injector pump has a flushing port, and the piston provides water to the flushing port during the reset stroke. Means at the flushing port is coupled to the inlet port of the reverse osmosis module during the reset stroke so that the reverse osmosis module can be flushed during the reset stroke. In addition, the water port of the injector pump is also coupled to the flushing port so that the water port of the pump can be supplied with water during reset stroke. This coupling of the flushing port includes a valve and means for opening the valve during the reset stroke and for closing the valve during the pumping stroke.

The piston can advantageously be driven on the pumping stroke by the feedwater under pressure, and a reset spring can be advantageously used to drive the piston on its return stroke. With this arrangement, no other energy source, such as an electric motor, is required to operate the injector pump.

In a preferred construction, the brine is injected into the portion of the conduit means which conducts the water away from the hot water heater. In addition, it is preferred to include a check valve for preventing flow from the hot water system to the injection pump.

Although the injector pump is particularly adapted for use in a reverse osmosis water system, it can be used in other pumping environments, if desired. In this regard, the injector pump has numerous features which are applicable to pumps in general, as well as to a pump for use with a reverse osmosis water system. For example, the brine valve and the water valve may include a spool which is controlled by the piston in a novel manner to provide for the desired flow through these valves. The spool can be driven by an energy storing device which stores energy from the movement of the piston and which is responsive to the position of the piston to release the energy to move the spool. This arrangement prevents stalling of the piston at either end of its stroke.

The invention, together with additional features and advantages thereof, may best be understood by reference to the following description taken in connection with the accompanying illustrative drawings.

BRIEF DESCRIPTION OF THE DRAWING

FIG. 2 is a view, partially schematic, of the water system, with the injector pump being illustrated in axial section and with the piston just beginning its pumping stroke.

FIG. 3 is an enlarged, fragmentary, sectional view of a portion of FIG. 2.

FIGS. 4 and 5 are views similar to FIGS. 2 and 3, respectively, with the piston just beginning its reset stroke.

DESCRIPTION OF THE PREFERRED EMBODIMENT

Figure 1:
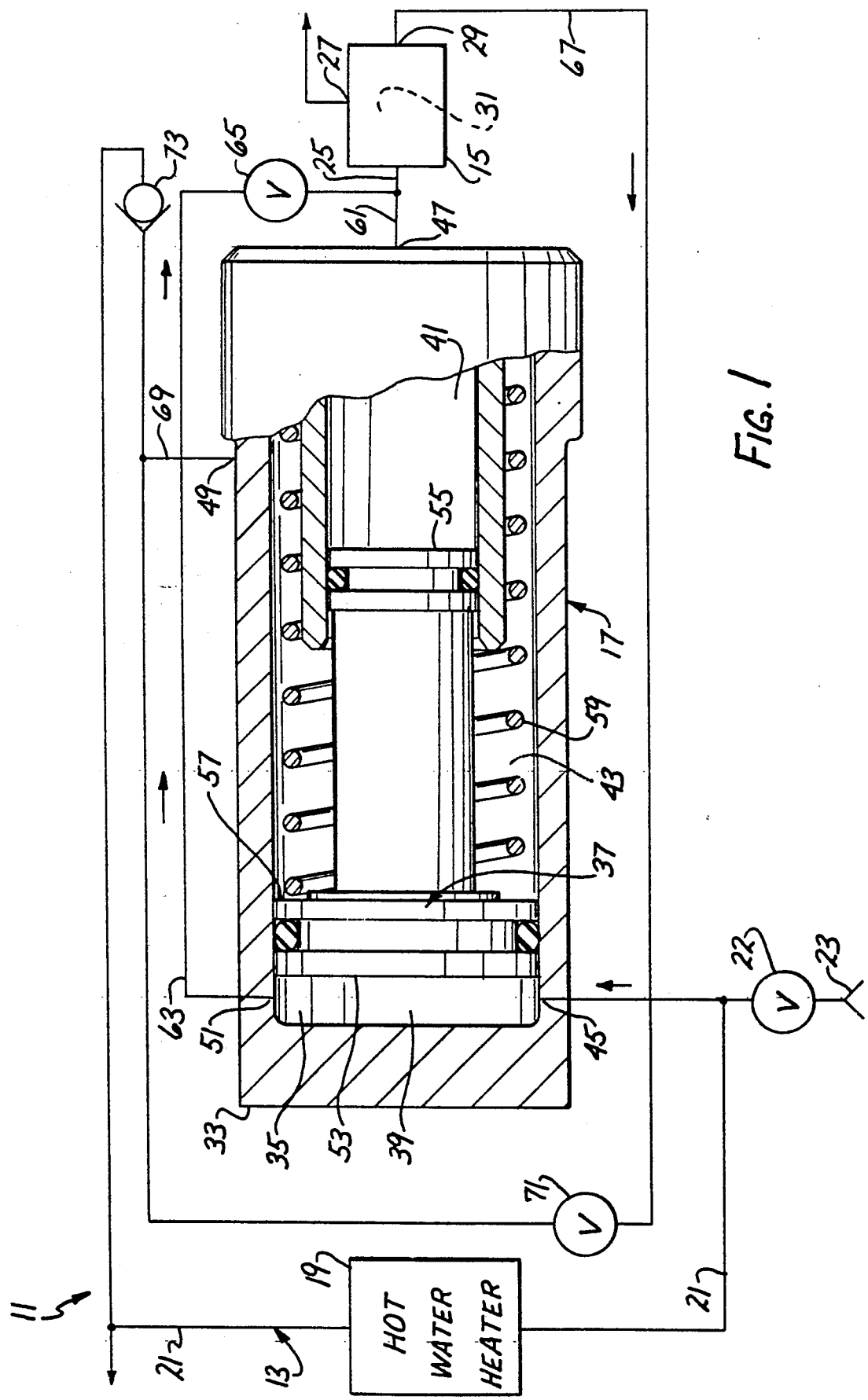
FIG. 1 is a schematic illustration of a reverse osmosis water system constructed in accordance with the teachings of this invention.

FIG. 1 shows a water system 11 which generally comprises a hot water system 13, a reverse osmosis module or filter 15 and an injector pump 17. The hot water system 13 includes a hot water heater 19 and conduit means 21 which lead from a manually operable supply valve 22 and a source 23 of feedwater, such as a city water supply, to the hot water heater 19 and from the hot water heater 19. The hot water heater 19 may be the conventional gas or electric hot water heater commonly found in residences.

The reverse osmosis module 15 is conventional and includes an inlet port 25, a product water port 27 for filtered product water and a brine outlet port 29 for brine. The module 15 also includes a reverse osmosis membrane 31.

The injector pump 17, which is shown only schematically in FIG. 1, includes a housing 33 having a cavity 35 and a differential area piston 37 reciprocable in the cavity through pumping and reset strokes and dividing the cavity into an inlet chamber 39, an outlet chamber 41 and a reversing chamber 43.

The housing 33 has a feedwater inlet port 45 communicating with the inlet chamber 39, a water port 47 communicating with the outlet chamber 41, a reversing or brine port 49 communicating with the reversing chamber 43 and a flushing port 51, also communicating with the inlet chamber 39.

The piston 37 has a large-area face 53 in the inlet chamber 39, a second smaller-area face 55 in the outlet chamber 41 and a reversing face 57 in the reversing chamber 43. A reset spring 59 acts against the reversing face 57 to urge the piston 37 to the left as viewed in FIG. 1 on its reset stroke.

A tube 61 couples the water port 47 to the inlet port 25 of the module 15. A tube 63 couples the flushing port 51 to the tube 61, and a water valve 65 is provided in the tube 63. A tube 67 joins the brine outlet port of the module 15 to the conduit means 21, and a tube 69 provides communication between the reversing port 49 and the tube 67. A brine valve 71 is provided in the tube 67 between the brine outlet port 29 and the tube 69, and a check valve 73 is provided in the tube 67 between the tube 69 and the conduit means 21 to prevent flow of water from the conduit means 21 back to the injector pump 17 while allowing the flow of brine from the injector pump to the conduit means 21.

The valves 65 and 71 are shut-off valves and are either in an open or closed position. During the pumping stroke when the piston 37 is moving to the right as viewed in FIG. 1, the valves 65 and 71 are closed. During the reset stroke when the piston 37 is moving to the left as shown in FIG. 1, the valves 65 and 71 are open. Although these valves could theoretically be manually operated, they are preferably operated in response to the linear position of the piston 37 in the cavity 35. There are a variety of known techniques for operating valves in response to piston location, and this can be accomplished, for example, by a suitable mechanical linkage between the piston 37 and the valves 65 and 71 or by electric switches which are actuated by the piston 37. When electric switches are used, the valves 65 and 71 are preferably solenoid valves.

In operation, the water system 11 is first primed in a conventional manner to assure that all of the tubes and the chambers 39, 41 and 43 of the injector pump 17 are fully charged with water. With the piston 37 at the left end of its path of travel, the valves 65 and 71 are closed. The inlet chamber 39 is then supplied with feedwater under pressure by opening the supply valve 22 to allow water to flow from the source 23 into the inlet chamber 39 to act on the large-area face 53 and urge the piston 37 to the right on its pumping stroke. However, travel of the piston 37 to the right is resisted by essentially line pressure in the reversing chamber 43, the reset spring 59 and the pressure in the outlet chamber 41. However, the pressure in the outlet chamber 41 acts on the reverse osmosis module 15 to begin the production of product water, and when this occurs, the pressure in the outlet chamber 41 drops sufficiently so that the feedwater under pressure in the inlet chamber 39 can move the piston 37 to the right on its pumping stroke. As the pumping stroke progresses, the water in the reversing chamber 43, which will be brine after system startup is completed, is forced out through the brine port 49 and the check valve 73 at a pressure greater than the pressure of the feedwater so that the water (brine after the completion of the startup procedure) is injected into the hot water system at the conduit means 21. In addition, the small-area face 55 of the piston 37 provides water to the water port 47 of the injector pump, and this is supplied to the inlet port 25 of the reverse osmosis module via the tube 61 so that the production of product water can continue.

With this system, the feedwater under pressure is the only energy utilized for boosting the pressure of the brine which is injected into the conduit means 21. The injector pump 17 boosts the pressure of the brine above feedwater pressure and reduces the pressure of the water furnished to the inlet port 25 of the module 15.

Because the valve 71 is closed, there is no brine flow in the tube 67. Also, because the valve 65 is closed, there is no flow of feedwater in the tube 63.

At or near the end of the pumping stroke, the valves 65 and 71 are simultaneously and abruptly opened. With these valves opened, the entire system; i.e., the chambers 39, 41 and 43 and the tubes 61, 63, 67 and 69 are all at essentially line or feedwater pressure. Consequently, the hydraulic forces acting on the piston 37 are balanced so that the reset spring 59 forces the piston 37 to the left on the reset stroke. Movement of the piston 37 to the left on its reset stroke forces feedwater out of the inlet chamber 39 through the flushing port 51, the tube 63 and the valve 65 to both the inlet port 25 of the module 15 and to the outlet chamber 41 to keep the outlet chamber full as the piston continues its leftward movement. The water supplied to the module 15 flushes the membrane 31, and this flush water or brine passes through the tube 67, the valve 71 and the tube 69 to the reversing chamber 57. Because the pressure of the brine is essentially feedwater pressure, there is no differential pressure to force the brine through the check valve 73 and into the conduit means 21.

At or near the end of the reset stroke, the valves 65 and 71 are simultaneously and abruptly closed. Thereafter, the pumping stroke is again initiated and repeated as described above.

FIGS. 2-5 show a physical implementation of the concept illustrated in FIG. 1. Except as shown or described herein, the structure and operation of the system 11a is the same as the structure and operation of the system 11. Portions of the system 11a shown in FIGS. 2-5 corresponding to portions of the system 11 shown in FIG. 1 are designated by corresponding reference numerals followed by the letter "a."

The primary differences between the systems 11 and 11a is that, in the system 11a, the valves 65a and 71a are within the housing 33a and are mechanically linked to the piston 37a. In addition, the check valve 73a is also provided in the pump housing 33a. Of course, the system 11a is shown in greater structural detail than is the system 11.

The housing 33a has two additional ports 101 and 103 which communicate with portions of the tubes 67a and 69a, respectively, and with an extension of the cavity 35a in which a sleeve 105 is fixedly mounted. A spool 107 is mounted for sliding movement within the sleeve 105 and cooperates therewith to form a spool valve. The spool 107 has a central axial passage 109 leading from the feedwater inlet port 45a to an inner region of the cavity 35a (FIGS. 3 and 5) with such portion of the cavity communicating with the inlet chamber 39a. Accordingly, the feedwater inlet chamber 39a is continuously exposed to feedwater under pressure from the feedwater inlet port 45a.

The water valve 65a includes a land 111 on the spool 107, a groove 113 in the sleeve 105 and a port 115 in the sleeve 105. Accordingly, during the reset stroke when the piston 37a is moving to the left (FIGS. 4 and 5), the valve 65a is open, and feedwater under pressure can be supplied from the cavity 35a through the groove 113 and the port 115 to the flushing port 51a and the tubes 63a and 61a to both the water port 47a and the module 15a (FIGS. 4 and 5). Conversely, when the piston 37a is moving to the right on its pumping stroke, the valve 65a is closed in that the land 111 blocks communication between the groove 113 and the port 115 (FIG. 3).

The brine valve 71a includes lands 117 and 119 on the spool 107 (FIGS. 3 and 5), ports 121 and 123 in the sleeve 105, and an annular groove 125 in the sleeve.

With the piston 37a moving on its reset stroke (FIGS. 4 and 5), the valve 71a is open in that there is communication between the ports 101 and 103 via a port 121, the groove 125 and the port 123. Conversely, with the piston 37a on its pumping stroke (FIGS. 2 and 3), the land 117 blocks communication between the ports 121 and 123. Appropriate seals, which may be in the form of O-rings are provided around the sleeve 105 and the spool 107 as best shown in FIGS. 3 and 5.

As shown in FIG. 2, a sleeve 127 is suitably mounted within the housing 33a and cooperates with the face 55a to define the outlet chamber 41a. Annular seals 129 and 131 are provided around the portions of the piston 37a which is slidably received within the sleeve 127 and the housing 33a, respectively.

To enable the movement of the piston 37a to bring about a shift in position of the spool 107 with consequent opening and closing of the valves 65a and 71a, a drive rod 133 is slidably received within a bore 135 of the piston 37a and is drivingly coupled to the spool 107 by a suitable lost-motion connection 137 which, in this embodiment, includes flanges 139 and 141 on the drive rod 133 and the spool 107, respectively. A cam 143 is fixedly mounted on the drive rod 133 and includes conical ramps 145 and 147 which meet along a circular apex 149. Two or more identical resilient drivers 151 are mounted in radial bores of the housing 33a. Each of the resilient drivers 151 includes a cam follower 153 and a spring 155 for resiliently biasing the cam followers 153 into engagement with the cam 143.

With the components shown in the position of FIGS. 2 and 3 and with the piston 37a moving to the right on its pumping stroke, a retaining ring 157 carried by the piston eventually engages a collar 159 at the right end of the drive rod 133 so that subsequent movement of the piston 37a to the right also moves the drive rod to the right. Such movement of the drive rod 133 to the right does not move the spool 107 because of the lost-motion connection 137. However, such movement of the drive rod 133 to the right moves the cam 143 to the right to cause the cam followers 153 to move up the ramp 145 thereby compressing and storing energy in the springs 155. When the apex 149 passes beyond the centers of the cam followers 153, the lost-motion connection still prevents the rod 133 from moving the spool 107 to the right. However, as the apex 149 passes beyond, i.e., to the right as viewed in FIGS. 2 and 3 of the centers of the cam followers 153, the cam followers are thereafter quickly forced down the ramp 147 by the energy stored in their springs 15 to thereby cam the drive rod 133 suddenly to the right sufficiently to engage the flanges 139 and 141 of the lost-motion connection 137 and move the spool 107 the short distance to the right necessary to open the valves 65a and 71a. This reverses the motion of the piston 37a as described above in connection with FIG. 1 so that the piston moves on its reset stroke. As the piston 37a nears the end of the reset stroke, an internal shoulder 161 in the bore 135 of the piston 37a engages the collar 159 of the drive rod 133 to move the drive rod and the cam 143 to the left. Accordingly, the cam followers 153 ride up on the ramp 147, and after the apex 149 passes the centers of the cam followers, the springs 155 act through the cam followers 153 to move the cam and the drive rod 133 abruptly to the left. This causes the flange 139 to contact the outer face of the land 111 of the spool 107 to move the spool 107 to the position of FIG. 3 in which the valves 65a and 71a are closed. The lost-motion connection 137 enables some travel of the drive rod 133 to the left without causing engagement of the flange 139 with the spool 107 and, therefore, without moving the spool. Thus, with this construction, the cam 143, the cam followers 153, and the springs 155 are driven by the piston 37a to store energy, and the cam followers 153 and the cam 143 are responsive to the position of the piston 37a to release energy to move the spool 107. The lost-motion connection 137 allows the force from the piston 37a to be used solely to cock the springs 155 or store energy in the springs 155 and not to be used directly for movement of the spool 107.

Although exemplary embodiments of the invention have been shown and described, many changes, modifications and substitutions may be made by one having ordinary skill in the art without necessarily departing from the spirit and scope of this invention.

I claim:

1. A water system comprising:
   a hot water system including a hot water heater and conduit means coupled to feedwater under pressure for conducting water to and from the hot water heater;
   a reverse osmosis module having an inlet port, a product water port for filtered product water and a brine outlet port for brine;
   an injector pump coupled to the feedwater under pressure and having a water port coupled to the inlet port of the reverse osmosis module and a brine port coupled to the brine outlet port of the reverse osmosis module and the conduit means; and
   the injector pump including means for providing water to said water port of the injector pump for supplying to the inlet port of the reverse osmosis module and means for increasing the pressure of the brine at the brine port of the injector pump to greater than the pressure of the feedwater whereby the brine can be injected into said hot water system.

2. A system as defined in claim 1 including a brine valve for controlling the flow of brine from the brine port of the injector pump to said hot water system.

3. A system as defined in claim 2 wherein the brine valve is controlled by the injector pump.

4. A system as defined in claim 1 wherein the injector pump has an inlet chamber for receiving the feedwater and the system includes a water valve for controlling the flow of water from the inlet chamber of the injector pump to the water port of the injector pump.

5. A system as defined in claim 4 wherein the water valve is controlled by the injector pump.

6. A system as defined in claim 4 including a brine valve for controlling the flow of brine from the brine port of the injector pump to said hot water system and said brine valve and said water valve are controlled by said injector pump.

7. A system as defined in claim 1 wherein the injector pump includes a piston having pumping and reset strokes, said piston providing water to said water port of the injector pump and brine to said brine port of the injector pump during said pumping stroke.

8. A system as defined in claim 7 wherein the pressure of the water at the water port of the injector pump during the pumping stroke is less than the pressure of the feedwater whereby the injector pump reduces the pressure of the water supplied to the reverse osmosis module.

9. A system as defined in claim 7 wherein the injector pump has a flushing port and the piston provides water to the flushing port during the reset stroke and means for coupling the flushing port to the inlet port of the reverse osmosis module during the reset stroke whereby the reverse osmosis module can be flushed during the reset stroke.

10. A system as defined in claim 9 wherein the means for coupling the flushing port includes a valve, means for opening the valve during the reset stroke and for closing the valve during the pumping stroke.

11. A system as defined in claim 7 wherein the injector pump has a flushing port and the piston provides water to the flushing port during the reset stroke and means for coupling the flushing port to the water port of the injector pump whereby the water port of the pump can be supplied with water during the reset stroke.

12. A system as defined in claim 11 wherein the means for coupling the flushing port includes a valve, means for opening the valve during the reset stroke and for closing the valve during the pumping stroke.

13. A system as defined in claim 1 wherein the piston is driven on its pumping stroke by the feedwater.

14. A system as defined in claim 1 wherein the brine is injected into the portion of the conduit means which conducts water away from the hot water heater.

15. A system as defined in claim 1 including a check valve for preventing flow from the hot water system to the injector pump.

16. A water system comprising:
   a hot water system including a hot water heater and conduit means coupled to feedwater under pressure for conducting water to and from the hot water heater;
   a reverse osmosis module having an inlet port, a product water port for filtered product water and a brine outlet port for brine; and
   means driven by the feedwater under pressure for supplying water to the inlet port of the reverse osmosis module at less than the pressure of the feedwater and for supplying brine from the brine port of the reverse osmosis module to the hot water system at a greater pressure than the pressure of the feedwater.

17. A system as defined in claim 16 wherein said means is driven solely by the feedwater under pressure to supply the water to the inlet port of the reverse osmosis module and the brine to said hot water system.

* * * * *